Figure 1:
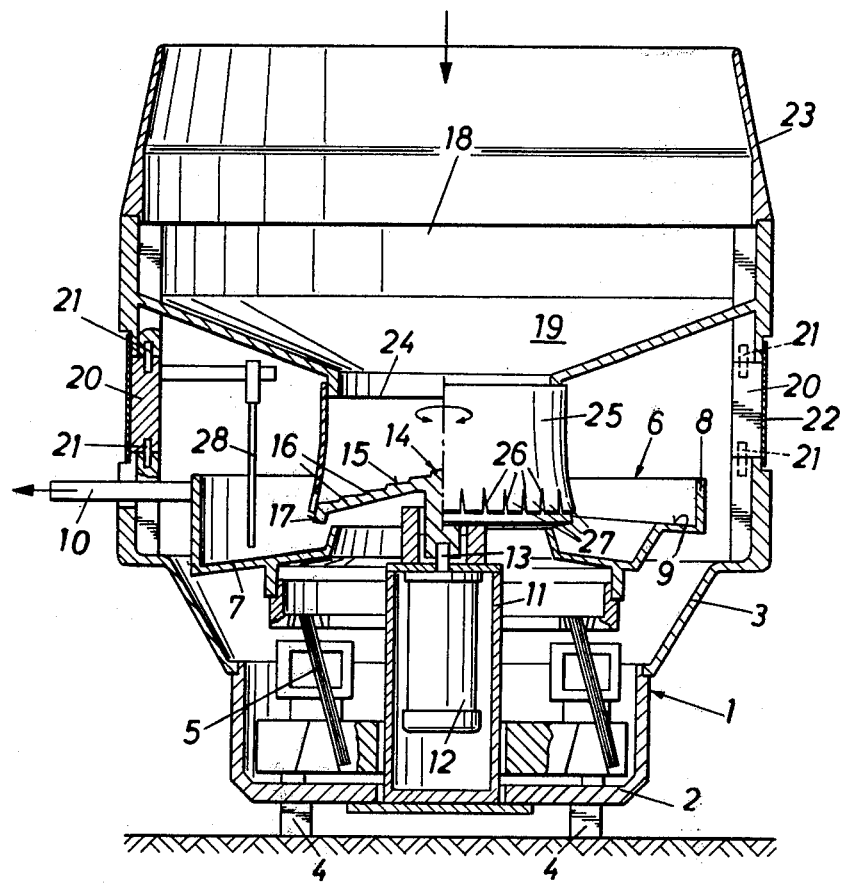

United States Patent [19]

Feldpausch

[11] 4,239,103
[45] Dec. 16, 1980

[54] OSCILLATING FEEDING APPARATUS

[76] Inventor: Hugo Feldpausch, Wassersteige 5, 5880 Lüdenscheid, Fed. Rep. of Germany

[21] Appl. No.: 12,560

[22] Filed: Feb. 15, 1979

[30] Foreign Application Priority Data

Feb. 15, 1978 [DE] Fed. Rep. of Germany ....... 2806331

[51] Int. Cl.³ .............................................. B65G 47/12
[52] U.S. Cl. .................................... 198/443; 198/391; 198/534; 221/183
[58] Field of Search ............... 221/167, 168, 182, 183, 221/184, 202, 203, 204, ; 133/3 A, 3 B, 3 R; 198/389, 443, 534, 540, 391

[56] References Cited

U.S. PATENT DOCUMENTS

| 1,979,659 | 11/1934 | Zierick | 133/3 A |
| 3,907,099 | 9/1975 | Smith | 198/389 |

FOREIGN PATENT DOCUMENTS

| 268735 | 2/1969 | Austria | 133/3 R |
| 2045950 | 3/1972 | Fed. Rep. of Germany . | |

*Primary Examiner*—F. J. Bartuska
*Attorney, Agent, or Firm*—Bacon & Thomas

[57] ABSTRACT

An oscillating feeding apparatus has an oscillating cup and a storage hopper. A rotatably driven separating disc is at the foot of the storage hopper and, at the lower edge of the storage hopper, there is provided an annular output opening which is closed by a flexible annular curtain. A separating disc defines a spiral path so that the parts are urged individually through the annular curtain into the oscillating cup.

5 Claims, 2 Drawing Figures

U.S. Patent

Dec. 16, 1980

4,239,103

OSCILLATING FEEDING APPARATUS

The invention relates to an oscillating feeding apparatus.

Such an oscillating feeding apparatus serves for the position-true arranging and feeding of parts to assembling machines, and the like. Within the oscillating cup there shall be present each time merely a small stock of parts so that it is possible to operate the oscillating cup at working conditions as constantly as possible. Consequently, a storage hopper is provided above the oscillating cup, the output opening of which supplying parts to the bottom of the oscillating cup. Normally, that storage hopper is positioned at the side of the oscillating feeding apparatus and is comparatively high. Then difficulties arise when filling such storage hopper. The storage hopper itself may work on a vibration basis. There may result malfunction in the feeding of parts in that bulky or complicated work pieces get tangled in the output region and block up the conveyance. Such a vibration bin generates a very high noise level, resulting in difficulties.

It is the object of the present invention to provide such an oscillating feeding apparatus that the storage hopper is easily accessible and that a uniform output of the work pieces from the storage hopper is secured.

This object is solved by the features of the present invention.

In that the storage hopper is arranged coaxially in regard to the oscillating cup, it is possible to place same comparatively deep. Consequently, the charging hole of the storage hopper is positioned at a small height so that the storage hopper always is easily accessible. The mouth of the storage hopper is provided as an annular gap which is formed by the unmatching or separating disc and the annular curtain. Consequently, there is a large outlet which distributes evenly parts over the periphery of the oscillating cup. That is extremely advantageous for the operation of the complete arrangement.

The separating disc has a conical surface, and, in addition, comprises a spiral path on its surface. Thereby an even conveyance of the work pieces to the outlet gap is guaranteed.

A drive mechanism of the separating disc is arranged below the oscillating cup in the centre of the housing. This measure renders possible a particularly deep arrangement of the storage hopper so that the overall height of the whole oscillating feeding apparatus thereby is comparatively small. The storage hopper takes up little additional place and the outlet thereof is placed entirely into the interior of the oscillating cup. The drive itself for the separating disc is incorporated in the centre of the housing of the oscillating cup.

Figure 2:
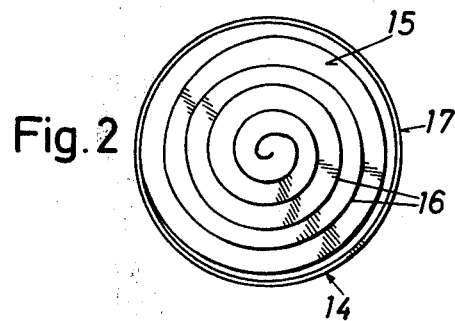

One embodiment of the invention will be described in the following with reference to the attached drawing, wherein FIG. 1 is a diagrammatic section through an oscillating feeding apparatus according to the invention, whilst FIG. 2 shows the separating disc as a horizontal projection.

The oscillating feeding apparatus is built up within a housing 1 having a bottom portion 2 and a wall portion 3. The bottom portion 2 is supported on feet 4. Within the bottom portion 2 there is provided an oscillating drive 5 for an oscillating cup 6, which comprises an annular bottom portion 7 as well as an annular wall 8 having a spiral path 9. The spiral path 9 serves for the guidance of the parts to an outlet 10. Aligning elements and guiding elements cooperate, in a known manner, with the spiral path 9 and the outlet 10; that is not illustrated in detail.

In the centre of the bottom portion 2 of the housing 1, there is provided a drive gearbox 11 which comprises a drive motor 12 with an output shaft 13, directed vertically upwards. Upon the output shaft 13 there is provided a separating disc 14, the surface 15 of which is conically shaped and comprises a spiral path 16. The edge 17 of the separating disc 14 is situated above the bottom portion 7 of the oscillating cup 6.

A storage hopper 18 having a funnel-shaped portion 19 is coaxially arranged above the oscillating cup 6 and is supported by supports 20 on the wall portion 3 of the housing 1. The supports 20 are connected by means of pins 21 with the wall portion 3 as well as with the storage hopper 18 so that the storage hopper 18 is firmly mounted on the housing 1. Around the supports 20 there is placed a tightening band 22 which seals off the housing 1 upwards. A top attachment 23 is placed upon the storage hopper 18. The funnel-shaped portion 19 is positioned with its mouth 24 above the separating disc 14. At the outer edge of the mouth 24 there is fastened an annular curtain 25 which, for example, is provided as a plastics hose. The lower front end of the annular curtain 25 comprises slots 26 extending in axial direction, for the formation of elastic strips 27. The front edge of the annular curtain 25 on the strip 27 overlaps the edge 17 of the separating disc 14.

A feeler 28 is directed to the bottom portion 7 of the oscillating cup and serves for the feeling of the filling quantity of the oscillating cup 6.

The oscillating cup 6 operates in the usual manner for the separation and arranging of work pieces which are fed, via the outlet 10, to an assembling machine or to another place of application. The storage hopper 18 is placed immediately above the oscillating cup 6 and, therefore, is easily accessible for the refilling of work pieces. The work pieces fall down through the mouth 24 of the storage hopper 18 and are positioned on the separating disc 14. In each case for the discharging of parts, the drive motor 12 is put in operation so that the separating disc 14 is rotated. The spiral path 16 urges the work pieces each individually outwards. At the edge of the separating disc 14 the work pieces lift the strips 27 of the annular curtain 25 and are moved out each individually through this outlet gap of the storage hopper and fall down to the bottom portion 7 of the oscillating cup 6.

The feeler 28 reacts upon the quantity of the parts in the oscillating cup 6. If such quantity of the work pieces exceeds a preset value, then the drive motor 12 is stopped. If the quantity of the work pieces within the oscillating cup is reduced again due to the delivery of work pieces through the outlet 10, then the drive motor 12 is actuated again so that parts from the storage hopper 18 are refilled into the oscillating cup 6. The feeding of the parts from the storage hopper 18 is extremely uniform. A blocking of the outlet gap practically is impossible due to the fact that the outlet gap extends over the total circumference of the separating disc 14. Likewise a tangling or hooking of parts within the storage hopper 18 is impossible. Of course, the size of the strips 27 is to be coordinated with the size of the work pieces to be treated in the specific case.

The drive for the storage hopper 18 is placed in the centre of the housing 1 so that above the oscillating cup 6 and within the storage hopper 18 any space for the drive is not required. Consequently, the storage hopper 18 may be comparatively large and can accommodate a quantity of work pieces as large as possible. The spiral path 15 of the separating disc 14 secures that work pieces of any kind desired and also work pieces of a complicated shape are moved individually and dosed through the outlet gap of the storage hopper 18, so-to-speak are screwed out. The resilient annular curtain effects that the work pieces fall out each just one by one. The development of noise of the feeding from the storage hopper is unexpectedly low. Primarily that can be traced to the fact that the feed from the storage hopper works vibration-free. The work pieces are treated with care and saved by this careful feeding by means of the separating disc 14 so that damages of the work pieces cannot occur. The whole oscillating feeding apparatus can be capsuled by one single hood so that an optimum noise prevention is given.

The top attachment 23 renders possible an extension of the volume of the storage hopper 18.

The tightening band 22 covers the interior space of the feeding apparatus. However, after the releasing of the tightening band 22 the interior space, to a large extent, is freely accessible so that necessary operations and maintenance work can be carried out.

I claim:

1. Feeding apparatus having an oscillating cup, a housing enclosing the oscillating cup, a storage hopper on said housing, a rotatably supported conical bottom plate below said storage hopper and above said oscillating cup, a funnel leading from said storage hopper toward said bottom plate and defining therewith an annular outlet opening, means on said bottom plate defining a spiral path, an annular flexible curtain around said funnel, extending across said annular outlet opening and overlapping the edge of said bottom plate, and drive means for rotating said bottom plate.

2. Oscillating feeding apparatus according to claim 1, characterized in that the drive mechanism (12) is positioned below the oscillating cup (6) in the centre of the housing (1).

3. Oscillating feeding apparatus according to claim 1 or claim 2, characterized in that the lower edge of the annular curtain (25) comprises slots, (26) extending in axial direction, for the formation of resilient strips (27).

4. Oscillating feeding apparatus according to claim 1, characterized in that the head of the storage hopper (18) is supported by means of supports (20) on the housing (1).

5. Oscillating feeding apparatus according to claim 4, characterized in that a tightening band (22) is placed around the supports (20), which tightening band extends in the shell surface of the housing (1).

* * * * *